United States Patent
Migneco et al.

(10) Patent No.: US 10,807,439 B2
(45) Date of Patent: Oct. 20, 2020

(54) VEHICLE CLIMATE CONTROL SYSTEM WITH OCCUPANT BASED TEMPERATURE CONTROL

(71) Applicant: LEAR CORPORATION, Southfield, MI (US)

(72) Inventors: Francesco Migneco, Salene, MI (US); David Gallagher, Sterling Heights, MI (US); Arjun Yetukuri, Rochester Hills, MI (US); Vyachislav Ivanov, West Bloomfield, MI (US)

(73) Assignee: Lear Corporation, Southfield, MI (US)

( * ) Notice: Subject to any disclaimer, the term of this patent is extended or adjusted under 35 U.S.C. 154(b) by 85 days.

(21) Appl. No.: 15/915,611

(22) Filed: Mar. 8, 2018

(65) Prior Publication Data
US 2019/0275860 A1    Sep. 12, 2019

(51) Int. Cl.
*B60H 1/00* (2006.01)
*B60H 1/22* (2006.01)

(52) U.S. Cl.
CPC ..... *B60H 1/00742* (2013.01); *B60H 1/00285* (2013.01); *B60H 1/00292* (2013.01); *B60H 1/00757* (2013.01); *B60H 1/00878* (2013.01); *B60H 1/00985* (2013.01); *B60H 2001/2246* (2013.01); *B60H 2001/2259* (2013.01)

(58) Field of Classification Search
CPC ............ B60H 1/00742; B60H 1/00285; B60H 1/00292; B60H 2001/2246
See application file for complete search history.

(56) References Cited

U.S. PATENT DOCUMENTS

| | | |
|---|---|---|
| 8,831,836 B2 | 9/2014 | Chang |
| 2008/0202139 A1 | 8/2008 | Darroman et al. |
| 2009/0301116 A1 | 12/2009 | Nathan et al. |
| 2013/0232996 A1* | 9/2013 | Goenka ................. B60N 2/56 62/3.61 |
| 2014/0148706 A1 | 5/2014 | Van Treeck et al. |
| 2015/0313475 A1 | 11/2015 | Benson et al. |
| 2016/0137028 A1* | 5/2016 | Trego ................. B60H 1/00742 165/203 |
| 2017/0080779 A1* | 3/2017 | Sagou ................ B60H 1/00285 |
| 2017/0216086 A1* | 8/2017 | Bouchama ................ A61F 7/00 |
| 2017/0282930 A1* | 10/2017 | Kochhar ............... B60W 40/09 |
| 2019/0084372 A1* | 3/2019 | Gallagher ............ G06K 9/2018 |

FOREIGN PATENT DOCUMENTS

| | | |
|---|---|---|
| GB | 2344647 A | 6/2000 |
| WO | 2014014862 A2 | 1/2014 |
| WO | 2016070052 A1 | 5/2016 |

* cited by examiner

*Primary Examiner* — Jonathan Bradford
(74) *Attorney, Agent, or Firm* — Brooks Kushman P.C.

(57) ABSTRACT

A climate control system for a vehicle includes an infrared sensor disposed within a passenger compartment of the vehicle. The infrared sensor is configured to receive infrared radiation from a skin surface of a vehicle occupant. The climate control system further includes a controller configured to receive a signal indicative of a detected temperature detected at the skin surface. In response to the detected temperature deviating from a baseline temperature, the controller is configured to automatically control an HVAC system to add conditioned air into the passenger compartment and to control a thermoelectric device configured to adjust a seat surface temperature.

20 Claims, 2 Drawing Sheets

VEHICLE CLIMATE CONTROL SYSTEM WITH OCCUPANT BASED TEMPERATURE CONTROL

TECHNICAL FIELD

The present disclosure relates to climate control systems and methods of operation.

BACKGROUND

A climate control system is disclosed in Nathan et al. U.S. Patent Application Publication No. 2009/0301116 A1, which published on Dec. 10, 2009.

SUMMARY

In at least one approach, a climate control system for a vehicle is provided. The climate control system may include an infrared sensor disposed within a passenger compartment of the vehicle. The infrared sensor may be configured to receive infrared radiation from a skin surface of a vehicle occupant. The climate control system may further include a controller to receive a signal indicative of a detected temperature detected at the skin surface. In response to the detected temperature deviating from a baseline temperature, the controller may be configured to automatically control an HVAC system to add conditioned air into the passenger compartment and to control a thermoelectric device configured to adjust a seat surface temperature.

In at least one approach, a climate control system for a vehicle is provided. The climate control system may include a seat assembly disposed within a passenger compartment of the vehicle. The seat assembly may include a seat bottom mounted to a vehicle body and a seat back mounted adjacent to the seat bottom. A muscle sensor may be secured to at least one of the seat bottom and the seat back. The muscle sensor may be configured to detect a shiver event of a vehicle occupant. The climate control system may further include a heating device and a controller. The controller may be configured to receive a signal indicative of a shiver event and, in response, automatically adjust an operating parameter of the heating device.

In at least one approach, a method for controlling a vehicle climate system is provided. The method may include receiving infrared radiation from a skin surface of a vehicle occupant at an infrared sensor disposed within a passenger compartment of the vehicle. The method may further include, at a controller, receiving a temperature signal indicative of a temperature at the skin surface. The method may further include, at the controller, automatically controlling an HVAC system to add conditioned air into the passenger compartment in response to the temperature signal deviating from a baseline temperature.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Referring now to the figures, an environmental or air conditioning system for a vehicle and method for conditioning the environment of a passenger compartment of a vehicle are disclosed and illustrated. Based at least on non-invasive passenger comfort determinations, the system and method may be capable of cooling or heating of the passenger compartment to account for a passenger's comfort level.

Figure 1:
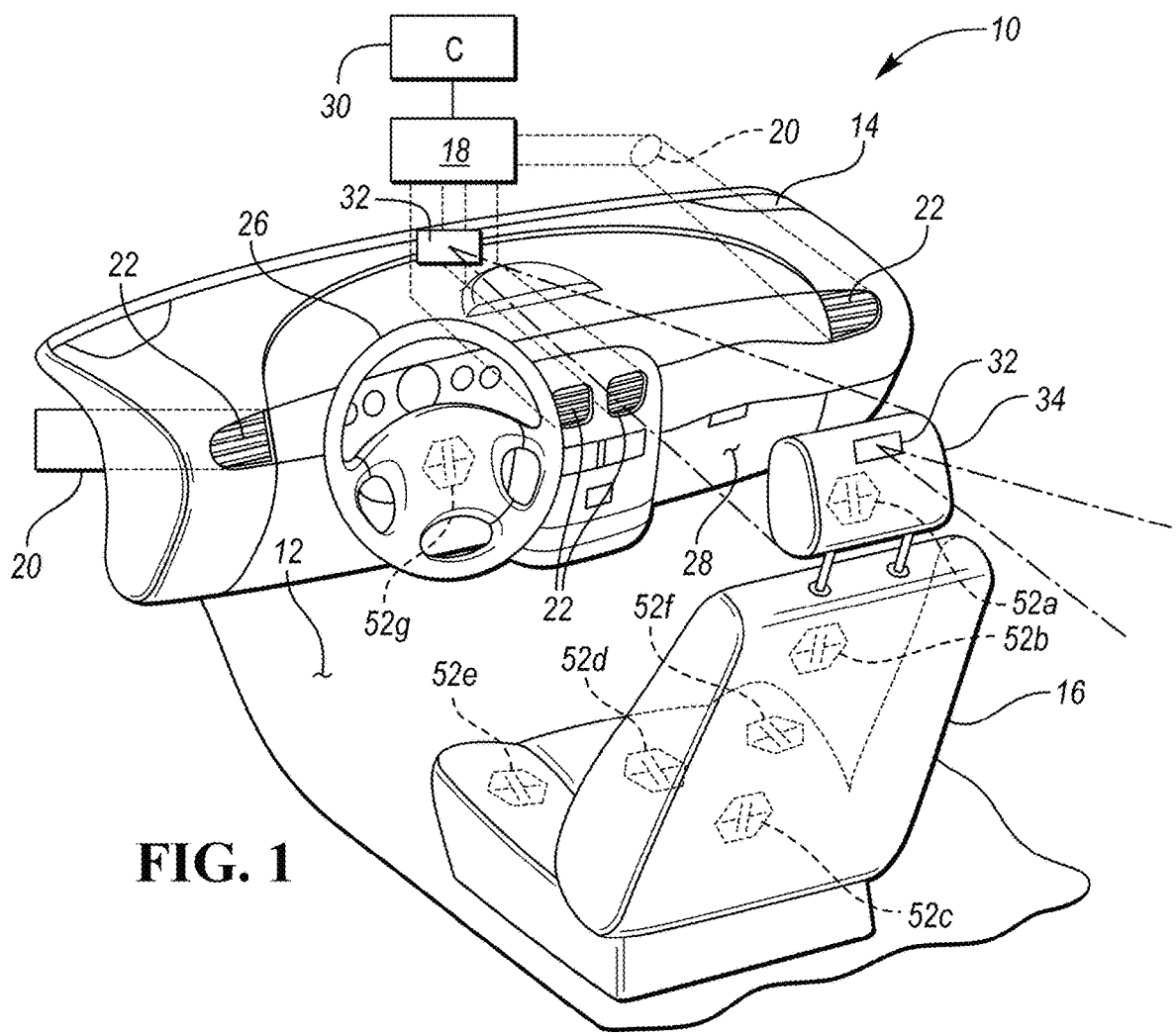
FIG. 1 is an illustration of a climate control system for use with a passenger compartment in a vehicle.
Figure 2:
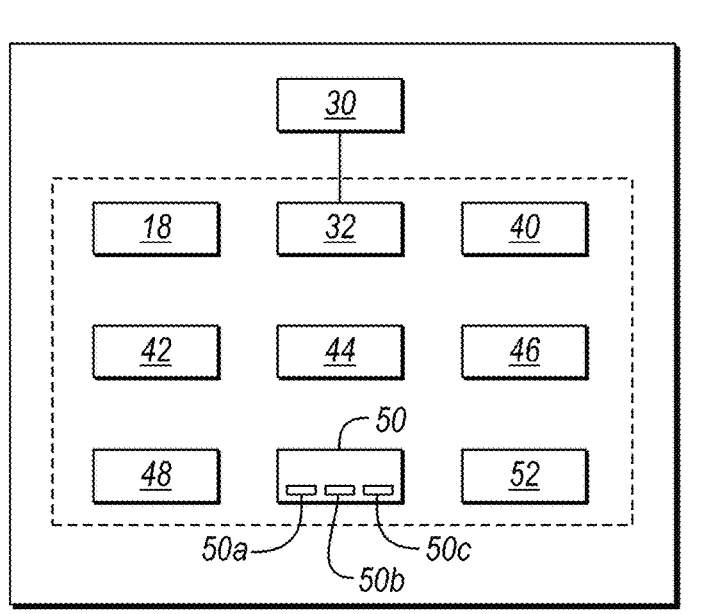
FIG. 2 is a schematic diagram illustrating the interconnectivity of devices communicating with a controller of the climate control system.

FIGS. 1 and 2 depict a climate control system 10 disposed in a passenger compartment 12 of a vehicle. The passenger compartment 12 may include a dashboard or instrument panel 14 disposed adjacent one or more passenger seats 16. It is understood that the system disclosed herein can be provided in any portion of the passenger compartment, such as the instrument panel, the headliner, door panels, and/or other interior panels. The exact number and location of heating, ventilating and air conditioning (HVAC) systems can be varied, depending on a number of factors. For example, differently sized vehicles may have different heating and cooling requirements, as well as more or less space available in which to locate an HVAC system.

Air circulation in a vehicle may be provided through an HVAC system, generally referenced by block 18. An HVAC system 18 may include a heater core and an air-conditioning evaporator that treat the air prior to delivery to the passenger compartment 12 via the air delivery ducts 20 through one or more vents 22 in the dashboard 14. Although the HVAC system 18 is described primarily with respect to a dashboard application, the HVAC system 18 may be applied to other vehicle interior assembly applications. In at least one example, vents 22 may be disposed in various locations of the passenger compartment of the vehicle, including near the steering wheel 26. One or more vents 22 may be directed at a driver's seating area. Additionally, one or more vents 22 may be disposed adjacent the glove compartment 28 aimed at a passenger's seating area. The output of these vents 22 may also reach the seating area corresponding to the rear seat of the vehicle. Alternatively, secondary vents (not shown) may be disposed adjacent the rear passenger seating area in surface materials covering support pillars or floor consoles to provide treated air to these portions of the passenger compartment of the vehicle.

A controller 30 may be connected to, or otherwise in communication with, various components of the climate control system 10 to monitor and control the operation of the one or more components. The controller 30 may also be connected to, and can be used to control, secondary heating and cooling mechanisms, such as thermocouple elements incorporated into the vehicle seats. Alternatively, the controller may include multiple electronic control units, with each one configured to control one or more of the elements of the thermal control system. Furthermore, such multiple electronic control units may be configured to communicate with each other and/or with a primary controller.

The controller 30 can be a single device or a number of devices. Control module, module, controller, control unit, processor and similar terms may mean one or various combinations of one or more of Application Specific Integrated Circuit(s) (ASIC), electronic circuits, central processing units (preferably microprocessor(s)) and associated memory and storage, executing one or more software or firmware programs, combinational logic circuits, input/output circuits and devices, appropriate signal conditioning and buffer circuitry, and other suitable components. The controller 30 may have sets of control algorithms, including software program instructions and calibration references stored in memory and executed to provide desired functions. Algorithms may be executed at predetermined times or loops, such as by a central processing unit, and may be operable to monitor inputs from sensing devices and other networked control modules, and execute control and diagnostic routines to control operation of actuators, or algorithms may be executed in response to occurrence of an event.

The climate control system 10 may further include a thermography device such as a thermal imaging device. The thermal imaging device may be, for example, an infrared camera or infrared sensor 32 that may be responsive to infrared light. The infrared sensor 32 may include a video camera, a digital camera, or combination thereof.

The infrared sensor 32 may be disposed such that it is directed in the direction of an occupant's face. In at least one approach, the infrared sensor 32 may be disposed at or near the dashboard 14, and may be directed in the direction of a headrest 34 of the vehicle seat 16. In at least another approach, the infrared sensor 32 may be integrated within, or disposed on, a headrest. For example, a first infrared camera may be disposed at or near a first lateral side of the headrest, and second infrared camera may be disposed at or near an opposite second lateral side of the headrest. The first and second infrared cameras may be directed in a forward direction at an angle such that the respective fields of view overlap. In this way, the first infrared camera may be directed in a direction of one side of a user's face, and the second infrared camera may be directed in a direction of the opposite side of the user's face. In still another example, the infrared camera may be disposed at a rear region of the headrest, and may be directed in the direction of a headrest of another seat disposed behind the seat 16. In this way, the infrared camera may be directed at another passenger seated in another passenger seat of the vehicle.

The infrared sensor 32 may be adapted to detect (e.g., receive) radiation at the infrared sensor 32. The detected radiation may be in the long-infrared range of the electromagnetic spectrum (e.g., approximately 8,000-15,000 nanometers or 8-15 μm) and/or in the mid-infrared range (e.g., approximately 3,000-8,000 nanometers or 3-8 μm). As such, the infrared sensor 32 may have a pixel array sensitive to the mid-infrared and/or long-infrared bands of the electromagnetic spectrum.

Referring now to FIG. 2, the climate control system 10 may include a thermal sensor 40 disposed in the passenger compartment 12 and in communication with the controller 30. The thermal sensor may be adapted to detect the ambient temperature within the passenger compartment 12. As thermal sensor 40 detects a cooling of the air inside the passenger compartment, thermal sensor 40 may send a signal to the controller 30 indicative of the temperature within the passenger compartment.

The climate control system 10 may further include an occupant sensor 42 that may detect the presence of an occupant in seat 16 within the vehicle. The occupant sensor 42 may take any form including a detector capable of detecting when a seatbelt is latched, a weight detector capable of detecting the presence of objects in a seat, an infrared sensor, and a sonar device, to name a few. If the occupant sensor 42 detects that a vehicle seat 16 is unoccupied, then one or more components of the climate control system 10 associated with that vehicle seat 16 may not be activated. For example, an associated infrared sensor 32 may be placed in an inactive mode if the occupant sensor 42 detects that a vehicle seat 16 is unoccupied.

In still another approach, the infrared sensor 32 may perform as occupant sensor. For example, the infrared sensor 32 may be activated upon, or shortly after, a start event such as door open, vehicle ignition, pedal pressure, shifter movement, etc. Upon being activated, the infrared sensor 32 may be determine whether an associated passenger seat 16 is occupied by a user. If the infrared sensor 32 detects that a vehicle seat 16 is unoccupied, the infrared sensor 32 may be placed in an inactive mode.

The climate control system 10 may further include additional warming and cooling devices that may not be associated with the HVAC system 18. For example, the climate control system 10 may include a heater 44 that may be operated by the controller 30. The heater 44 may be a positive temperature coefficient (PTC) heater, a resistive heater, or other type of heater adapted to quickly provide heated air to the passenger compartment 12. The heater 44 may be a dedicated heater and as such, may not require engine coolant to provide the heated air.

The additional warming and cooling devices may include user-interfacing heating/cooling devices 46. The user-interfacing heating/cooling devices 46 may be a thermoelectric device that may be, for example, a seat-based or seat-integrated device. The thermoelectric device may be integrated in a seat 16 of the vehicle, and may be a conduction heating/cooling system. The seat-based device may be adapted to warm or cool the seat 16, and more particularly, to adjust a seat surface temperature. The seat surface may be a seat surface disposed in contact with the user (e.g., through the user's clothing). As such, the thermoelectric device may effect a conductive heat transfer between the user and the seat surface.

In at least one approach, the seat-based device may be, for example, a seat warmer or a seat ventilation system capable of circulating air (e.g., from the passenger compartment 12, HVAC system 18, or dedicated device such as a Peltier device) through at least a portion of the passenger seat 16. As such, the thermoelectric device may include appropriate ducting located throughout a seat portion and/or a backrest portion of the vehicle seat to direct heated or cooled air directly onto the body of the seat occupant.

The user-interfacing heating/cooling devices 46 may also or instead include a steering wheel-based device that may be integrated in the steering wheel 26 of the vehicle. The steering wheel-based device may be adapted to warm or cool the steering wheel 26.

The climate control system 10 may further include a memory 48 that may be in communication with (e.g., accessed by) the controller 30. The memory 48 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), and read-only memory. In some examples, the memory 48 includes multiple kinds of memory, particularly volatile memory and non-volatile memory. The memory 48 may include, or may be connected to a storage that may be any high-capacity storage device, such as a hard drive, and/or a solid state drive.

The climate control system 10 may further include a user interface 50. In at least one approach, the user interface 50 includes a display screen 50a for visually displaying an image to a user. The display screen 50a may be disposed, for example, in the dashboard 14 of the vehicle. The display screen 50a may also be a touch screen (e.g., a capacitive touch screen) adapted to receive a user input; for example, in the form of a finger press. In at least another approach, the user interface 50 includes a speaker 50b for providing an audible annunciation. The speaker 50b may be one or more speakers 50b, and may be disposed throughout various locations within the passenger compartment 12. In still another approach, the user interface includes a microphone 50c for receiving an audible annunciation.

The climate control system 10 may further include one or more muscle sensors 52. The muscle sensor 52 may be any sensor adapted to detect a shiver event of the vehicle occupant. The muscle sensor 52 may be, for example, a vibration monitor, and may measure displacement, velocity, and/or acceleration. The muscle sensor 52 may be, for example, a piezoelectric sensor (such as a piezoelectric accelerometer or a piezoelectric displacement transducer), an electromagnetic velocity sensor. The muscle sensor 52 may be selected according to known performance parameters (such as for example sensitivity, amplitude, frequency range). The muscle sensor 52 may include a microelectromechanical system (MEMS) device, and may be sensitive to acceleration in one, or two (2D), or three dimensions (3D). In this way, the muscle sensor 52 may be adapted to directly sense of movement of a muscle mass.

In still another approach, the muscle sensor 52 may be a biosignal sensor adapted to sense electrical biosignals (e.g., bioelectrical time signals) from a user. In at least one approach, the muscle sensor 52 is an electromyograph (EMG), and more particularly, a surface EMG adapted to detect and record electrical activity produced by skeletal muscles of a user. Other biosignal sensors, such as electrocardiographs (ECG) may be also or instead be used. The muscle sensor may include a plurality of electrodes and a differential amplifier, and may be adapted to detect electric potential generated by muscle cells when the cells are electrically or neurologically activated.

As shown in FIG. 1, one or more muscle sensors may be disposed throughout the passenger compartment 12, for example, at a headrest 34 (muscle sensor 52a), within a seatback of the seat 16 at an upper area of the seatback (muscle sensor 52b), within a seatback of the seat 16 at a lower area of the seatback (muscle sensor 52c), at a central portion of a seating surface of the seat 16 (muscle sensor 52d), at a left portion of a seating surface of the seat 16 (muscle sensor 52e), at a right portion of a seating surface of the seat 16 (muscle sensor 52f), or any combination thereof. In addition, or in the alternative, a muscle sensor may be disposed at the steering wheel 26 (muscle sensor 52g). The muscle sensor 52g may be disposed at a central region of the steering wheel 26 (e.g., at the hub), at a periphery of the steering wheel 26 (e.g., at the wheel portion), or at both the central region and the periphery.

In this way, the muscle sensor 52 may be engaged by at least a portion of a user's body. Moreover, the muscle sensor 52 may receive electric potential generated by muscle cells and recording the potential difference (voltage difference) between the electrodes. Based at least in part on the potential difference, one or both of the muscle sensor 52 and the controller 30 may detect a shiver event from a user in contact with the muscle sensor 52.

As discussed, the infrared sensor 32 may be directed in a direction of an anticipated location of an occupant's face. The anticipated location may correspond, for example, to a location of the headrest of the seat 16. In this way, the thermogram may visually depict temperatures associated with the occupant's face.

As discussed, the infrared sensor 32 (or associated controller) may receive temperature indications associated with the various locations of an occupant's face.

Figure 3:
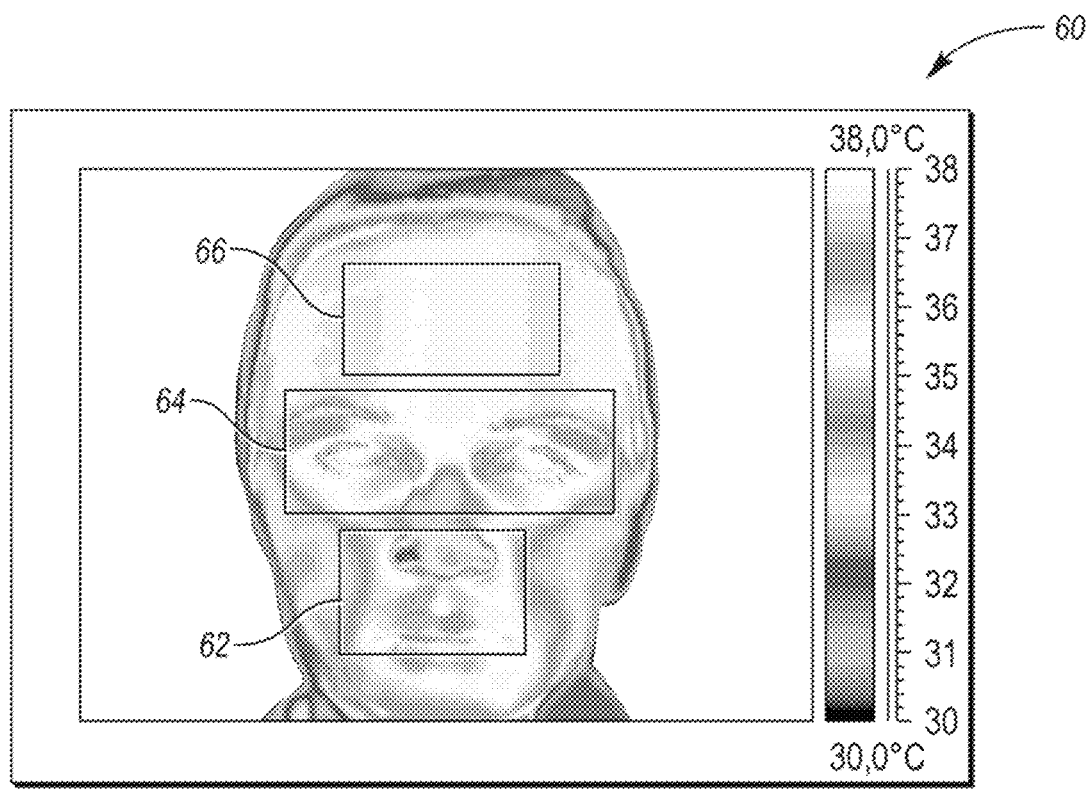
FIG. 3 is a first thermogram depicting a baseline thermal signature.
Figure 4:
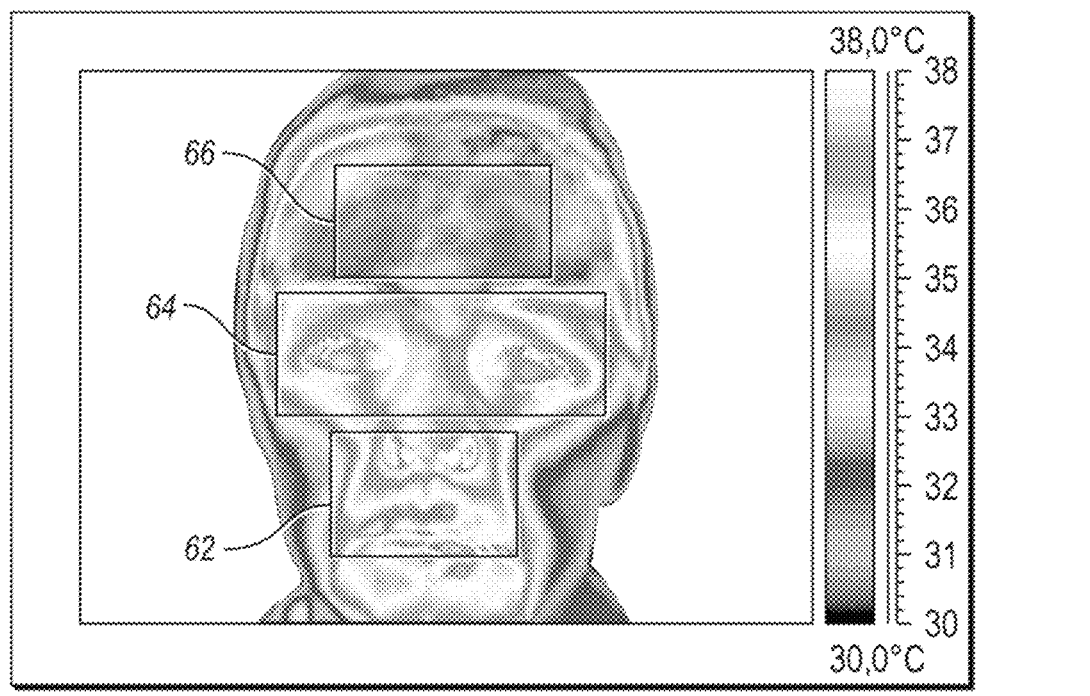
FIG. 4 is a second thermogram depicting a deviation from the baseline thermal signature.

Referring momentarily to FIGS. 3 and 4, the temperature indications may be represented as an image of detected radiation, which may be referred to as a thermogram 60. The thermogram 60 may visually depict amounts of black body radiation emitted from an occupant as a function of the occupant's temperature. The thermogram 60 may visually depict the radiation as color, grayscale, black-and-white images, or suitable combinations thereof.

A normal human body temperature range may typically be in the range of 32.0-37.0° C. (89.6-98.6° F.). An average internal temperature may be approximately 37.0° C. (98.6° F.). Such an average temperature may be the mean temperature of the whole skin area of the body. In many instances, temperatures of an occupant's face, and more particularly, the occupant's mouth, nose, and forehead areas, may provide an indication of the occupant's comfort level. Furthermore, in cold conditions, an occupant may wear clothing covering most skin surfaces, and portions of an occupant's face may be the only skin surfaces exposed to the cabin air.

In at least one approach, a baseline temperature (or baseline temperature profile) may be provided (e.g., programmed). The baseline temperature may be stored, for example, in the memory 48, and may be accessed by one or more components of the climate control system 10, such as the controller 30. In at least one approach, the baseline temperature is a temperature range that may be, for example, approximately 32.0 to approximately 37.0° C. (89.6-98.6° F.). In at least another approach, the baseline temperature may be a single temperature; for example, approximately 34.5° C. (94.1° F.).

In still another approach, a baseline temperature may be learned through user input. For example, a user may provide an input at the user interface 50 indicative of a comfort level. The user input may be binary, or may indicate a degree of comfort. Example user inputs may include receiving a user touch at the display screen 50a or receiving an audible user input at the microphone 50c. In still another approach, a baseline temperature may be learned through machine learning (ML) or artificial intelligence (AI), as discussed in greater detail elsewhere herein.

The controller 30 may be adapted to receive a signal indicative of a detected temperature that may be detected at the skin surface of a user (e.g., at a facial region of the user). The controller 30 may further be adapted to compare the detected temperature to the baseline temperature. The controller 30 may be adapted to control one or more components of the climate control system 10 in response to the detected temperature deviating from the baseline temperature. For example, the controller 30 may be adapted to automatically control an HVAC system 18 to add conditioned air into the passenger compartment 12 in response to the detected temperature deviating from a baseline temperature.

The controller 30 may be adapted to control the HVAC system 18 in response to the detected temperature deviating a predefined threshold from the baseline temperature. The predefined threshold may be approximately 0.25° C., approximately 0.5° C., approximately 0.75° C., approximately 1.0° C., approximately 1.25° C., approximately 1.5° C., approximately 1.5° C., approximately 1.75° C., approximately 2° C., or greater than approximately 2° C.

In at least one approach, the controller 30 may be adapted to operate a cooling system (e.g., an air conditioning system) of the HVAC system 18 in response to the detected temperature deviating above the baseline temperature by the predefined threshold. The controller 30 may also be adapted to operate a heating system (e.g., via a heater) of the HVAC system 18 in response to the temperature deviating below the baseline temperature by the predefined threshold.

The controller 30 may be adapted to control one or more components of the climate control system 10 according to a first climate parameter in response to the detected temperature deviating a first predefined threshold from the baseline temperature.

The controller 30 may further be adapted to control one or more components of the climate control system 10 (e.g., the same component or a different component) according to a second climate parameter in response to the detected temperature deviating a second predefined threshold from the baseline temperature. For example, the controller 30 may be adapted to operate the HVAC system 18 according to a first climate parameter in response to the detected temperature deviating a first predefined threshold from the baseline temperature, and may be adapted to operate the HVAC system 18 according to a second climate parameter different than the first climate parameter in response to the detected temperature deviating a second predefined threshold from the baseline temperature. The second predefined threshold may have a greater deviation from the baseline temperature than the first predefined threshold. For example, the first predefined threshold may be approximately 0.5° C., and the second predefined threshold may be approximately 1.0° C.

In one example approach, the controller 30 may be adapted to activate a heating device in response to the temperature deviating the second predefined threshold from the baseline temperature. The heating device may a heater 44 which may be an electric heater. In this way, the HVAC system 18 may include at least one fan adapted to communicate airflow from the electric heater through a duct 20 and into the passenger compartment 12. The heating device may also, or instead, be one or more user-interfacing heating/cooling devices 46, which may include a seat-based heating device or a steering wheel-based heating device.

In at least one approach, a climate control system for a vehicle is provided. The climate control system may include a seat assembly (e.g., passenger seat 16) disposed within a passenger compartment 12 of the vehicle. The seat assembly may include a seat bottom adapted to be mounted to a vehicle body and a seat back adapted to be mounted adjacent to the seat bottom. A muscle sensor 52 may be secured to at least one of the seat bottom and the seat back. The muscle sensor 52 may be adapted to detect a shiver event of a vehicle occupant. The muscle sensor 52 may be, for example, an electromyograph adapted to detect electric potential generated by muscle cells of the vehicle occupant. The electromyograph may include a plurality of electrodes secured to the seat assembly.

The climate control system may further include a heating device. The heating device may be one or more of a seat warmer adapted to warm a seat surface of the seat assembly, a steering wheel warmer adapted to warm a steering wheel surface, and a HVAC system having a blower motor adapted to add heated air into the passenger compartment.

The climate control system may further include a controller 30. The controller 30 may be adapted to receive a signal indicative of a shiver event. In at least one approach, the controller 30 may automatically adjust an operating parameter of heating device in response to receiving the signal indicative of a shiver event. This may include, for example, at least one of activating the seat warmer, activating the steering wheel warmer, and adjusting a speed of the blower motor.

The climate control system may also include an infrared sensor 32 disposed within the passenger compartment 12 of the vehicle. As discussed, the infrared sensor 32 may be adapted to receive infrared radiation from a skin surface of the vehicle occupant. The controller 30 may further be adapted to receive a temperature signal indicative of a temperature at the skin surface. In response to the temperature signal deviating from a baseline temperature, the controller 30 may be adapted to automatically control an HVAC system to add heated air into the passenger compartment.

The controller 30 may further be adapted to receive a signal indicative of an air temperature. The air temperature may be an external air temperature (e.g., external of the vehicle), an internal air temperature (e.g., within the passenger compartment 12), or other suitable air temperature. The controller 30 may also receive multiple air temperatures of various locations (e.g., through a plurality of signals). The controller 30 may be adapted to compare the received air temperature against a threshold air temperature. In this way, the controller 30 may be informed of both a shiver event and cold air temperatures. The controller 20 may further be adapted to automatically adjust the operating parameter of heating device in response to receiving the signal indicative of the shiver event and the air temperature being below the threshold air temperature. In this way, the detection of a cold air temperature may serve to reduce the frequency of false-positive detections of shiver events.

Referring again to FIG. 3, an example thermogram 60 is shown. The thermogram 60 may represent infrared radiation received at the infrared sensor 32 from a skin surface of a vehicle occupant. A controller, such as controller 30, may identify discrete facial regions, such as a lips and nostrils region 62, an eye region 64, and a forehead region 66.

The thermogram 60 of FIG. 3 may depict a baseline thermal signature. The baseline thermal signature may include a single baseline temperature of the entire face, a single baseline temperature for a single facial region (e.g., an eye region 64), or may include multiple baseline temperatures associated with multiple facial regions (e.g., lips and nostrils region 62, eye region 64, and forehead region 66). The baseline temperature may be an average temperature for a given area, an extreme high temperature for a given area, an extreme low temperature for a given area, or any suitable combination thereof.

Referring now to FIG. 4, another example thermogram 70 is shown. The thermogram 70 of FIG. 4 may depict a thermal signature that deviates from the baseline thermal signature, indicating user discomfort. For example, the thermogram 70 may indicate elevated temperatures at one or more of the facial regions 62, 64, 66. Conversely, a thermogram may indicated lowered temperatures at one or more of the facial regions 62, 64, 66.

In at least one approach, the controller 32 may determine whether elevated temperatures deviate from the baseline temperature by a predefined threshold. The predefined threshold may be approximately 0.25° C., approximately 0.5° C., approximately 0.75° C., approximately 1.0° C., approximately 1.25° C., approximately 1.5° C., approximately 1.5° C., approximately 1.75° C., approximately 2° C., or greater than approximately 2° C. In at least one approach, the controller 32 may determine whether elevated temperatures exceed a baseline temperature range. The baseline temperature range may be, for example, approximately 32.0° C. to approximately 37.0° C. As discussed, when elevated temperatures deviate from the baseline temperature by a predefined threshold, or when elevated temperatures exceed a baseline temperature range, the controller 30 may be adapted to automatically control an HVAC system 18 or other climate control system 10 components to add conditioned air into the passenger compartment 12.

In at least one approach, the controller 32 may be adapted to effect an annunciation mode when the user thermal signature deviates from the baseline thermal signature. More particularly, the controller 32 may be adapted to effect at least one of a visual annunciation (e.g., at display screen 52a), an audible annunciation (through speakers 50b), and a haptic annunciation (through vibration devices at the seat or steering wheel) when the user thermal signature that deviates from the baseline thermal signature. The annunciation may communicate to a user that the climate control system 10 has detected discomfort. The annunciation may also communicate to a user at which particular facial regions the climate control system 10 has detected elevated or lowered temperature signatures. The annunciation may also communicate to a user a detected temperature. The annunciation may also communicate to a user that the climate control system 10 has detected elevated or lowered temperature signatures that may be indicative of a health concern (such as fever, hypothermia, or hyperthermia).

In at least one approach, a method for controlling a vehicle climate system is provided. The method may include receiving infrared radiation from a skin surface of a vehicle occupant at an infrared sensor disposed within a passenger compartment of the vehicle. The method may further include, at a controller, receiving a temperature signal indicative of a temperature at the skin surface. The method may further include, at the controller, automatically controlling an HVAC system to add conditioned air into the passenger compartment in response to the temperature signal deviating from a baseline temperature.

The method may further include, at the controller, operating the HVAC system according to a first climate parameter in response to the temperature deviating a first predefined threshold from the baseline temperature. The method may further include, at the controller, operating the HVAC system according to a second climate parameter different than the first climate parameter in response to the temperature deviating a second predefined threshold from the baseline temperature, the second predefined threshold having a greater deviation from the baseline temperature than the first predefined threshold.

The method may further include, at a muscle sensor, detecting a shiver event of the vehicle occupant. The controller may be adapted to automatically control the HVAC system in response to the temperature signal deviating from a baseline temperature and the controller receiving a signal indicative of a shiver event.

The method may further include, at an annunciation device disposed within the passenger compartment, effecting at least one of a visual annunciation, an audible annunciation, and a haptic annunciation when the temperature signal is indicative of a temperature at the skin surface being outside of the range of approximately 32° C. to approximately 37° C.

The method may further include producing a thermal image in response to receiving infrared radiation from the skin surface of the vehicle occupant. The thermal image may be, for example, a thermogram such as thermogram 60 or thermogram 70.

The controller may perform a facial recognition routine on the thermal image to determine a user identifier. For example, the controller may receive infrared radiation data points from unique landmarks of the skin surface of a vehicle occupant. The user identifier may be any suitable identifier. The controller may utilize machine learning (ML) or artificial intelligence (AI) to determine a thermal profile (e.g., temperature signature (e.g., range) when comfort) for a given vehicle occupant. As such, the thermal profile may be associated with a user identifier and may include at least one user-associated baseline temperature.

In at least one approach, the method may include storing the user identifier and associated the thermal profile in a memory, such as memory 38.

The method may further include, at the controller, accessing a stored user identifier and an associated stored thermal profile from the memory. The stored thermal profile may include a stored user-associated baseline temperature. The accessed stored user identifier and stored thermal profile may be associated with a user having a previously-stored user identifier, as determined during a facial recognition routine. The method may further include automatically controlling the HVAC system 18 to add conditioned air into the passenger compartment in response to the temperature signal deviating from the user-associated baseline temperature. The method may further include automatically controlling another climate control system 10 component to effect a skin temperature change of the user.

The method may further include modifying the stored user-associated baseline temperature associated with the stored user identifier, storing the modified stored user-associated baseline temperature in the memory. In this way, the climate control system may be adapted to modify a baseline temperature to account for season shifts. For example, a user may have a first baseline temperature in one season (e.g., winter) or at one time of day (e.g., morning), and a second baseline temperature in another season (e.g., summer) or at another time of day (e.g., evening) that is higher than the first baseline temperature. Although the differences in temperatures may be minimal (e.g., approximately 0.25° C., approximately 1° C., approximately 1.5° C., or greater), the climate control system can modify a stored user-associated baseline temperature to reduce the likelihood of a false discomfort determination.

Although described primarily with respect to an HVAC or climate control system for a vehicle, the subject matter set forth herein may be adapted and applied in various locations within a vehicle or may be applied in other non-vehicle applications. The system may be applied in various locations within a vehicle, such as in a dashboard, in an overhead console, in a center console, in a pillar, in a door panel, or in other console or module locations where air vents or outlets may be utilized.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A climate control system for a vehicle, comprising:
   an infrared sensor disposed within a passenger compartment of the vehicle, the infrared sensor directed toward an occupant's face and configured to receive infrared radiation from a skin surface of a plurality of facial regions of the occupant;
   a thermoelectric device positioned along a seat surface;
   a muscle sensor configured to detect a shiver event of the occupant; and
   a controller programmed to:
      receive a signal from the muscle sensor indicative of the shiver event;
      receive a signal from the infrared sensor indicative of a detected temperature detected at the skin surface of the plurality of facial regions; and,
      in response to detecting the shiver event and the detected temperature deviating from a baseline temperature in at least one of the plurality of facial regions, automatically control an HVAC system to add conditioned air into the passenger compartment and automatically control the thermoelectric device to adjust the seat surface temperature.

2. The climate control system of claim 1 wherein the controller is configured to control the HVAC system and the thermoelectric device in response to the detected temperature deviating a predefined threshold from the baseline temperature.

3. The climate control system of claim 2 wherein the controller is configured to operate a cooling system of the HVAC system in response to the detected temperature deviating above the baseline temperature by the predefined threshold, and wherein the controller is configured to operate a heating system of the HVAC system in response to the detected temperature deviating below the baseline temperature by the predefined threshold.

4. The climate control system of claim 1 wherein the controller is configured to operate the HVAC system according to a first climate parameter in response to the detected temperature deviating a first predefined threshold from the baseline temperature, and wherein the controller is configured to operate the HVAC system according to a second climate parameter different than the first climate parameter in response to the detected temperature deviating a second predefined threshold from the baseline temperature, the second predefined threshold having a greater deviation from the baseline temperature than the first predefined threshold.

5. The climate control system of claim 4 wherein the controller receives a plurality of signals, each signal indicative of the detected temperature detected at the skin surface at one of the plurality of facial regions from the infrared sensor.

6. The climate control system of claim 5 wherein the thermoelectric device is configured to heat the seat surface to increase the seat surface temperature and to cool the seat surface to decrease the seat surface temperature.

7. The climate control system of claim 1 wherein the baseline temperature is a temperature range of approximately 32.0° C. to approximately 37.0° C.

8. The climate control system of claim 1 wherein in response to the detected temperature deviating from the baseline temperature, the controller is configured to automatically control a thermoelectric device configured to adjust a steering wheel surface temperature.

9. The climate control system of claim 1 wherein the muscle sensor is secured to a vehicle seat, the muscle sensor configured to detect electric potential generated by muscle cells of the occupant.

10. A climate control system for a vehicle, comprising:
    a seat assembly disposed within a passenger compartment of the vehicle, the seat assembly including:
       a seat bottom mounted to a vehicle body,
       a seat back mounted adjacent to the seat bottom, and
       a muscle sensor secured to at least one of the seat bottom and the seat back, the muscle sensor configured to detect a shiver event of a vehicle occupant;
    an infrared sensor directed toward the occupant's face and configured to receive infrared radiation from a skin surface of a plurality of facial regions of the occupant;
    a heating device; and
    a controller programmed to:
       receive a signal from the muscle sensor indicative of the shiver event;
       receive a signal from the infrared sensor indicative of a detected temperature detected at the skin surface of the plurality of facial regions; and,
       in response to detecting the shiver event and the detected temperature deviating below a threshold value, automatically adjust an operating parameter of the heating device.

11. The climate control system of claim 10 wherein the muscle sensor is an electromyograph configured to detect electric potential generated by muscle cells of the vehicle occupant, and wherein the electromyograph includes a plurality of electrodes secured to the seat assembly.

12. The climate control system of claim 10 wherein the heating device is at least one of a seat warmer configured to warm a seat surface of the seat assembly, a steering wheel warmer configured to warm a steering wheel surface, and a HVAC system having a blower motor configured to add heated air into the passenger compartment, and wherein adjusting the heating device includes at least one of activating the seat warmer, activating the steering wheel warmer, and adjusting a speed of the blower motor.

13. The climate control system of claim 10 wherein automatically adjusting the operating parameter of the heating device comprises automatically controlling an HVAC system to add heated air into the passenger compartment.

14. The climate control system of claim 10 wherein the controller is further configured to:
receive a signal indicative of an air temperature, and
automatically adjust the operating parameter of the heating device in response to receiving the signal indicative of the shiver event and the air temperature being below a threshold air temperature.

15. A method for controlling a vehicle climate system, comprising:
providing an infrared sensor disposed within a passenger compartment of the vehicle and directed at an occupant's face;
receiving infrared radiation by the infrared sensor from a plurality of facial regions at a skin surface of the occupant; and sending a temperature signal indicative of a temperature at the skin surface, and
detecting a shiver event from a muscle sensor disposed in the passenger compartment of the vehicle;
in response to detecting the shiver event and the temperature signal deviating from a baseline temperature, automatically controlling an HVAC system to add conditioned air into the passenger compartment.

16. The method of claim 15 further comprising:
operating the HVAC system according to a first climate parameter in response to the temperature deviating a first predefined threshold from the baseline temperature; and
operating the HVAC system according to a second climate parameter different than the first climate parameter in response to the temperature deviating a second predefined threshold from the baseline temperature, the second predefined threshold having a greater deviation from the baseline temperature than the first predefined threshold.

17. The method of claim 15, further comprising: providing the muscle sensor in a vehicle seat.

18. The method of claim 15 further comprising:
providing an annunciation device disposed within the passenger compartment;
effecting at least one of a visual annunciation, an audible annunciation, and a haptic annunciation by the annunciation device when the temperature signal is indicative of a temperature at the skin surface being outside of the range of approximately 32° C. to approximately 37° C.

19. The method of claim 15 further comprising:
producing a thermal image in response to receiving infrared radiation from the skin surface at the plurality of facial regions of the occupant;
performing a facial recognition routine on the thermal image,
generating a user identifier and a thermal profile associated with the thermal image, wherein the thermal profile includes at least one user-associated baseline temperature, and
storing the user identifier and the thermal profile in a memory.

20. The method of claim 19 further comprising:
producing a second thermal image in response to receiving infrared radiation;
performing a second facial recognition routine on the second thermal image,
accessing from the memory a stored user identifier and a stored thermal profile having a stored user-associated baseline temperature, and
automatically controlling an HVAC system to add conditioned air into the passenger compartment in response to the temperature signal deviating from the stored user-associated baseline temperature;
modifying the stored user-associated baseline temperature associated with the stored user identifier; and
storing the modified stored user-associated baseline temperature in the memory.

* * * * *